United States Patent
Chavez et al.

(10) Patent No.: US 10,671,847 B2
(45) Date of Patent: Jun. 2, 2020

(54) SERVICE IMPLEMENTING A WORK FLOW BASED ON IMAGE ANALYSIS

(71) Applicant: Avaya Inc., Santa Clara, CA (US)

(72) Inventors: David Chavez, Broomfield, CO (US); Laurent Philonenko, San Francisco, CO (US)

(73) Assignee: Avaya Inc., Santa Clara, CA (US)

( * ) Notice: Subject to any disclaimer, the term of this patent is extended or adjusted under 35 U.S.C. 154(b) by 328 days.

(21) Appl. No.: 15/602,408

(22) Filed: May 23, 2017

(65) Prior Publication Data

US 2018/0341806 A1 Nov. 29, 2018

(51) Int. Cl.
  *G06K 9/00* (2006.01)

(52) U.S. Cl.
  CPC ..... *G06K 9/00664* (2013.01); *G06K 9/00771* (2013.01); *G06K 9/00973* (2013.01); *G06K 2209/27* (2013.01)

(58) Field of Classification Search
  None
  See application file for complete search history.

(56) References Cited

U.S. PATENT DOCUMENTS

| | | | |
|---|---|---|---|
| 10,242,285 B2* | 3/2019 | Thrasher | G06T 7/187 |
| 2003/0191766 A1* | 10/2003 | Elin | G06F 16/748 |
| 2009/0190741 A1 | 7/2009 | O'Connor | |
| 2009/0327945 A1* | 12/2009 | Tomizawa | G06Q 10/06 715/772 |
| 2010/0082821 A1* | 4/2010 | Rosenblatt | G06F 9/54 709/228 |
| 2014/0316841 A1* | 10/2014 | Kilby | G06Q 10/06316 705/7.26 |
| 2017/0323540 A1* | 11/2017 | Boykin | G08B 13/19613 |
| 2018/0189970 A1* | 7/2018 | Balasubramanian | H04N 7/185 |

FOREIGN PATENT DOCUMENTS

| | | |
|---|---|---|
| JP | 2004-178111 | 6/2004 |
| JP | 2011-107740 | 6/2011 |
| JP | 2013-045352 | 3/2013 |
| JP | 2016-096393 | 5/2016 |
| WO | WO 2014/192612 | 12/2014 |

OTHER PUBLICATIONS

Official Action with machine translation for Japan Patent Application No. 2018-098363, dated Jul. 18, 2019 4 pages.
Official Action with machine translation for Japan Patent Application No. 2018-098363, dated Mar. 3, 2020 6 pages.

* cited by examiner

*Primary Examiner* — Delomia L Gilliard
(74) *Attorney, Agent, or Firm* — Sheridan Ross P.C.

(57) ABSTRACT

An image (e.g., a picture) is received from a communication device. The image has associated metadata that is captured while the image is taken. For example, the metadata may be a location, a date, and a time of the picture. One or more object(s) (e.g., a car) along with characteristics of the object(s) in the image are identified. For example, a characteristic may be an action associated with the object, such as a person is running. In response to analyzing the one or more objects for the one or more characteristics in conjunction with the metadata, one or more potential workflows are determined (e.g., a workflow to call the police). A list that identifies the one or more potential workflows is sent to the communication device. Input to select one of the one or more workflows is received, which initiates the selected workflow.

20 Claims, 8 Drawing Sheets

SERVICE IMPLEMENTING A WORK FLOW BASED ON IMAGE ANALYSIS

BACKGROUND

With the proliferation of mobile communication devices and the Internet, users have the ability to easily capture and send pictures/videos. The pictures/videos can be used to supplement conversations with other users. For example, a user may take a picture and post the picture on a web site as part of an ongoing social media discussion.

In other systems, pictures may be used for routing a communication session in a contact center. For example, U.S. Patent Application Publication No. 2009/0190741 discloses that a client application may be used to take a picture that is used for routing a communication session in a contact center. In this case, the user requires a specific client application and the user needs to know the specific back-end service for accessing the contact center.

SUMMARY

These and other needs are addressed by the various embodiments and configurations of the present disclosure. An image is received from a communication device. For example, a user takes a picture of a person with a camera in the communication device. The image has associated metadata that is captured while the image is taken. For example, the metadata may be a location, date, a time, and/or the like. One or more object(s) (e.g., a car or person) along with characteristics of the object(s) in the image are identified. For example, a characteristic may be an action associated with the object, such as a person is running. Potentially the characteristic could be a condition associated with an object such as a leaky faucet or a broken window. Sometimes the interest could be a portion of the object like the sweater a passerby is wearing or the cover surrounding a laptop. It is also possible that the image is of an event like a softball tournament (object) at a nearby set of ball fields. In response to analyzing the one or more objects for the one or more characteristics in conjunction with the metadata, one or more potential workflows are determined (e.g., a workflow to call the police). An analysis engine tries to determine the intention of the person taking the image, so the creation of a potential list of workflows helps the analysis engine refine the focus without requiring an open description interface to the image taker that could prove to be overly cumbersome for the interface the image taker desires. A list that identifies the one or more potential workflows is sent to the communication device. Input to select one of the one or more workflows is received, which initiates the selected workflow.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
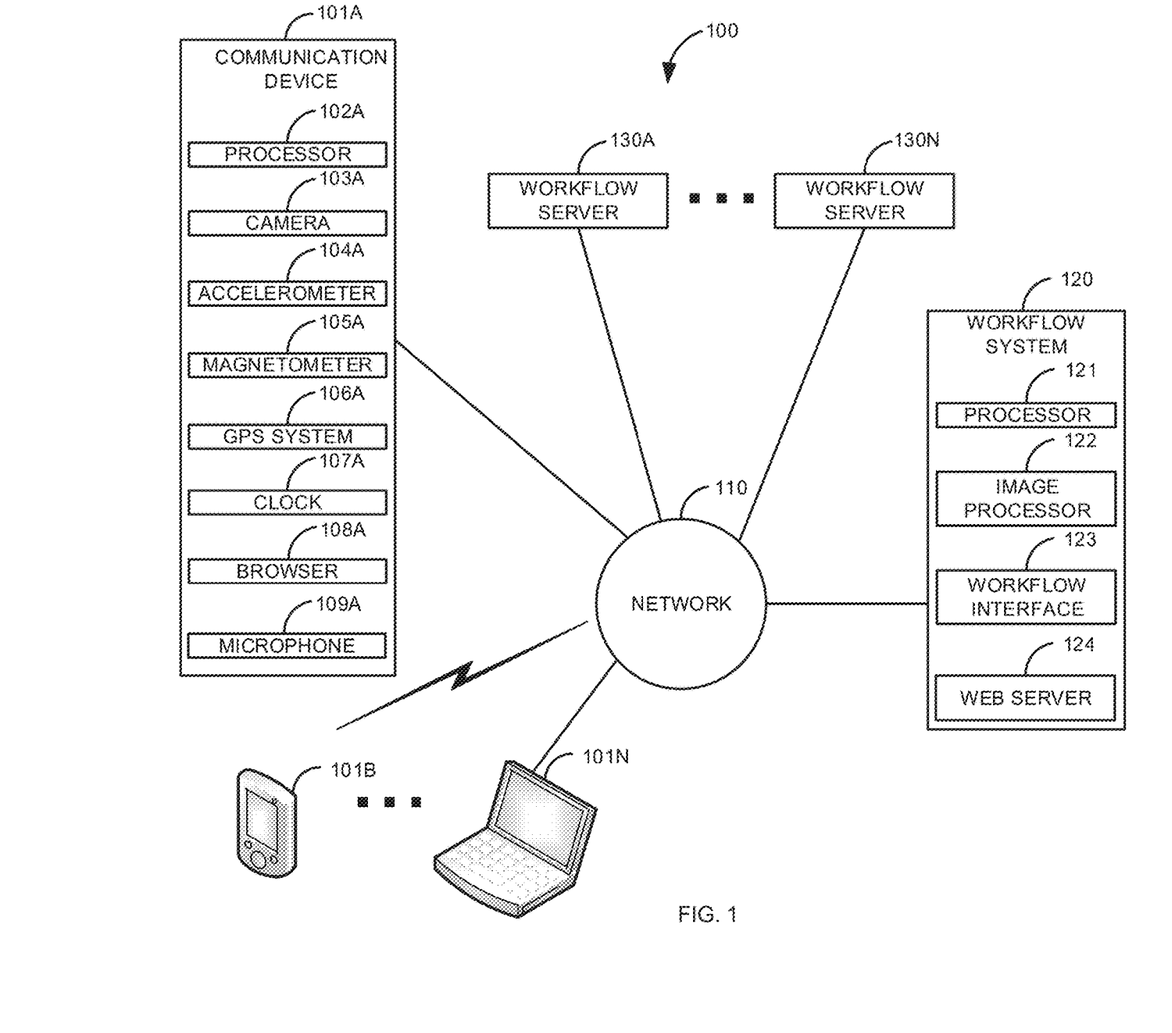
FIG. 1 is a block diagram of a first illustrative system for analyzing an image to identify workflows.

FIG. 1 is a block diagram of a first illustrative system 100 for analyzing an image to identify workflows. The first illustrative system 100 comprises communication devices 101A-101N, a network 110, a workflow system 120 and workflow servers 130A-130N. Note that each communication device 101A-101N does not need a dedicated workflow server 130. The numbering of the workflow servers is an expedience.

The communication device 101 can be or may include any user communication device that can communicate on the network 110, such as a Personal Computer (PC), a telephone, a cellular telephone, a Personal Digital Assistant (PDA), a tablet device, a notebook device, a smart phone, a smart television, and/or the like. As shown in FIG. 1, any number of communication devices 101A-101N may be connected to the network 110, including only a single communication device 101.

The communication device 101A comprises a processor 102A, a camera 103A, an accelerometer 104A, a magnetometer 105A, a Global Positioning Satellite (GPS) system 106A, a clock 107A, a browser 108A, and a microphone 109A. The processor 102A may be any hardware processor that can process information, such as a microprocessor, a Digital Signaling Processor (DSP), a microcontroller, a multi-core processor, an application specific processor, interfaces for network communications, along with software for message based communications to others including people using similar devices and services to automatically interact using such messages, and/or the like.

The camera 103A can be or may include any hardware camera 103 that can take images. The camera 103A may take images, such as, pictures and/or movies.

The accelerometer 104A can be any hardware element that can determine acceleration, such as a micromechanical accelerometer, a piezoelectric accelerometer, a piezo resistive accelerometer, a capacitive accelerometer, and/or the like. The accelerometer 104A can be used to determine a speed/motion of the communication device 101A. The accelerometer 104A may be used in conjunction with the camera 103A to determine a speed of the communication device 101A when an image is taken. For example, the communication device 101A may be in a car that is moving when the picture is taken. The speed of the communication device 101A, when the camera 103A takes an image, may be stored as metadata associated with the image. If the image is a movie, the metadata may be samples over a time of the movie.

The magnetometer 105A can be or may include any hardware element that can determine direction using the earth's magnetic field. The magnetometer 105A may be used in conjunction with the camera 103A to determine a direction (e.g., north) of the camera 103A when an image is taken. The direction the camera 103A is facing of the when the camera 103A takes an image may be stored as metadata associated with the image. If the image is a movie, the metadata may be samples over a time of the movie.

The GPS system 106A can be or may include any hardware system that can detect GPS signals to determine a location of the communication device 101A. Additionally location can be determined based on triangulation of cellular or WiFi signals and/or connection to a network 110. The location of the communication device 101A, when the camera 103A takes an image, may be stored as metadata associated with the image. If the image is a movie, the metadata may be samples over a time of the movie.

The clock 107A can be or may include any clock 107 that can be used to determine a time and date of when an image is taken. The time and date of when the camera 103A takes an image may be stored as metadata associated with the image. If the image is a movie, the metadata may be samples over a time of the movie.

The browser 108A, can be or may include any browser 108 that can work in conjunction with the web server 124. For example, the browser 108A may be Firefox™, Microsoft Explorer™, Safari, Google Chrome™, and/or the like.

The microphone 109A can be or may include any microphone that can be used capture sound information when an image is taken. The sound information of when an image is taken may be over time, such as during a video. The sound information may be stored as metadata associated with the image. For example, the sound of shots being fired may be captured and stored as metadata (e.g., as an MP3 file) when an image/video is taken. The sound information may be for a time period associated with a still image or for a time-lapse collection of images. For example, if a still image is taken, sound for a period of time before and/or after the image is taken may be stored as metadata.

Although not shown, the communication device 101A may comprise other elements that can detect a distance from the camera 103A to the image (e.g., radar). The distance from the image 101A, when the camera 103A takes an image, may be stored as metadata associated with the image. If the image is a movie, the metadata may be samples over a time of the movie.

Alternatively, other systems may be employed to determine an angle of the camera 103A in relation to an image. Angle detection can be accomplished using various types of image processing. The angle when the camera 103A takes an image may be stored as metadata associated with the image. If the image is a movie, the metadata may be samples over a time of the movie.

An altimeter may be used to determine altitude of the communication device 101 when the image is taken. The altitude of when an image is taken may be stored as metadata associated with the image. If the image is a movie, the metadata may be samples over a time of the movie.

A thermometer may be used to determine a temperature when the image is taken (e.g., 40 degrees). The temperature of when an image is taken may be stored as metadata associated with the image. If the image is a movie, the metadata may be samples over a time of the movie.

In FIG. 1, the communication devices 101B-101N do not show the elements 102-108. However, the communication devices 101B-101N may comprise some or all of the elements 102-108 and/or the additional elements discussed above.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), and the like. Thus, the network 110 is an electronic communication network configured to carry messages via packets and/or circuit switched communications.

The workflow system 120 can be or may include any hardware system, such as a server, a cluster of servers, a communication system, and/or the like. The workflow system 120 is used to identify workflows based on image analysis.

The workflow system 120 further comprises a processor 121, an image processor 122, a workflow interface 123, and a web server 124. The processor 121 may be the same as or different from the processor 102. The processor 121 may be able to support multiple communication sessions with multiple communication devices 101.

The image processor 122 can be or may include a hardware and/or software processor that can process images, such as a neural network, to determine different objects and characteristics associated with objects, actions associated with objects, or events associated with objects (characteristics). An object may be any kind of object in an image, such as, a car, a person, a sign, a device (e.g., a TV, a printer, a computer, etc.), an article of clothing, a house, a household item, a building, a door, a road, a mountain, a vehicle, and/or the like. A characteristic associated with an object may be its color, its make (manufacturer) or model (type) or condition (mint/damaged/broken), or any other visible distinguishing mark. An action could be something the object is doing like a person running or a person staring, or a faucet leaking water, or a house burning. An action is visible state that can be associated with the object from the image. An event is a virtual object that can be inferred from an image, for instance a collection of baseball players arranged on a baseball field are engaging in a baseball game event. Additionally, a collection of spectators looking at a speaker at a podium are at a speaking event. These are all simply examples of information that may be extracted from image analysis and are not meant to be comprehensive of all objects, characteristics, actions, or events. The image processor 122 may process images to identify objects using various image processing techniques. For example, the image processor 122 may use a pixel based segmentation, an edge based segmentation, a region based segmentation, a seed region growing algorithm, a watershed algorithm, and/or the like to identify separate objects in an image.

The image processor 122 takes the identified object(s), characteristic(s), and metadata associated with the image to determine possible workflows based on the image. A workflow is a process that is used to assist the user of the communication device 101. For example, a workflow may be for a plumber to fix a leaky shower head, to send the picture to an emergency 911 service, to order inventory from a factory, to call a tow truck, the get a manual to fix tire, to get a menu for a restaurant, to purchase an item, and/or the like.

The workflow interface 123 is an Application Programming Interface (API) that is used to send information to execute a workflow on a workflow server 130. The workflow interface 123 may convert information in one computer format to a format that can be used by the respective workflow server 130.

The web server 124 can be any web server 124 that can work with the browser 108, such as the Apache web server, Microsoft's IIS web server, nginx, GWS, and/or the like. The web server 124 may host an application used by the communication device 101 to identify a workflow.

The workflow servers 130A-130N can be or may include any hardware servers that can process a workflow, such as contact center, a project management system, a work tracking system, a search engine, an inventory ordering system, a factory control system, an emergency 911 system, a fire monitoring service, a police/fire alerting system, automotive repair system, a tow service system, a gardening service application, and/or the like. The workflow servers 130A-130N may comprises Application Programming Interfaces (API)s that allow the workflow system 120 to send software objects that can be used to initiate a workflow on a workflow server 130.

Figure 2:
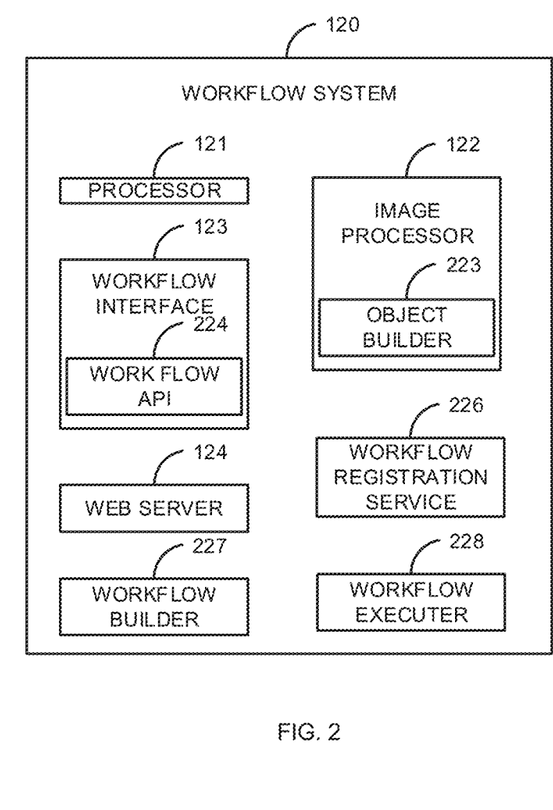
FIG. 2 is a block diagram of an exemplary embodiment of a workflow system.

FIG. 2 is a block diagram of an exemplary embodiment of a workflow system 120. In addition to the elements 121-124, the workflow system 120 may further comprise a workflow registration service 226, a workflow builder 227, and a workflow executer 228. The workflow registration service 226 can be or may include any software/firmware that can allow workflow services (e.g., on a workflow server 130) to register with the workflow system 120. When a workflow service registers, the image processor 122 can access the workflow service to execute a workflow via the workflow API 224.

The workflow builder 227 can be or may include any software/firmware that can automatically build a new workflow based on identification of an object in an image. The workflow builder 227 may build a workflow that may be stored for later access by other users based on identification of a similar object in an image.

The workflow executer 228 is used to execute newly created workflows created by the workflow builder 227. The workflow executer 228 may be an application that executes a specific type of workflow, such as a web search, a database search, and/or the like.

The image processor 122 may also comprise an object builder 223. The object builder 223 can be or may include any software/firmware that can build software objects. The software objects are used to provide data that can be sent to the workflow servers 130 to execute a workflow.

The workflow interface 123 may also comprises a workflow API 224. The workflow API 224 allows the workflow system 120 to be able to access different workflow servers 130A-130N that may use different protocols/computer formats. For example, the image processor 122 may provide software objects in one format that are converted to a specific format of the workflow server 130.

Figure 3:
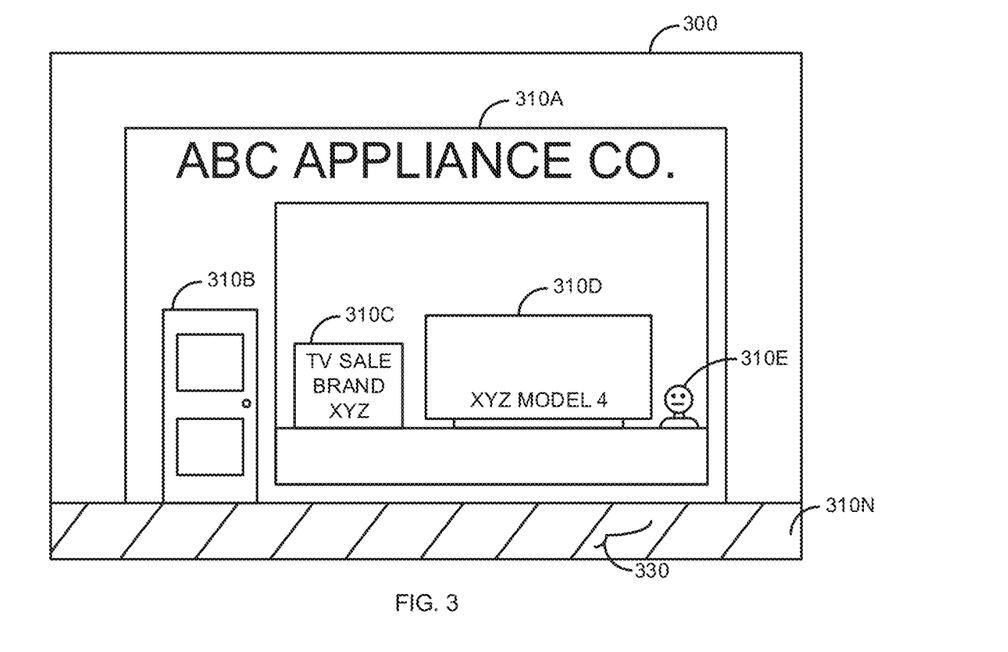
FIG. 3 is a diagram of an exemplary image.

FIG. 3 is a diagram of an exemplary image 300. An image 300 can be a still image, a full video, and anything in between. For example, the camera 103 may capture one second before and one second after a shot. Alternatively, the camera may capture a time-lapse collection of images or a full motion video. As discussed herein, an image 300 may comprise any of the above descriptions.

In FIG. 3, the image 300 is a picture (a still image) of a store taken by the camera 103 in the communication device 101. The image 300 comprises objects 310A-310N. The object 310A is a store object for ABC Appliance Company. The object 310B is a door object. The object 310C is a sign object that indicates a TV sale for brand XYZ TVs. The object 310D is a television object of a XYZ model 4 television. The object 310E is a person object. The object 310N is a sidewalk object. A crack 330 is in the sidewalk object 310N.

Figure 4:
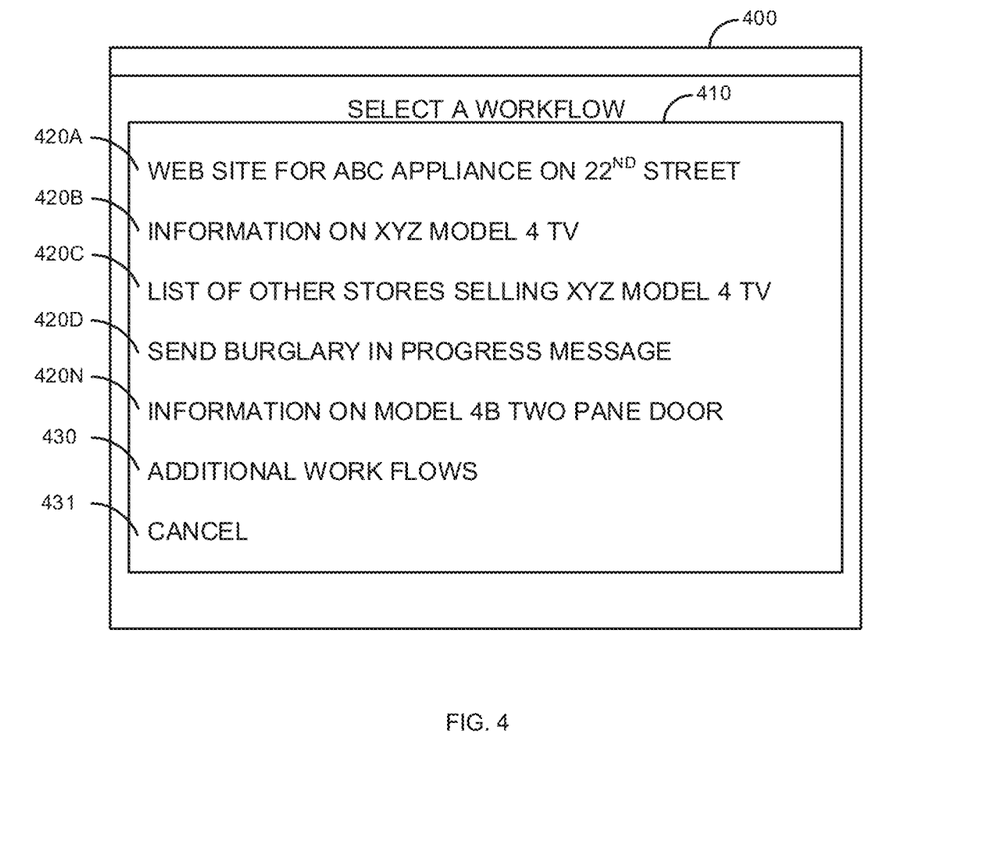
FIG. 4 is a diagram of an exemplary display of a list of potential workflows.

FIG. 4 is a diagram of an exemplary display of a list 410 of potential workflows 420A-420N. The list 410 of potential workflows 420A-420N is based on the image 300 of FIG. 3. The potential workflow 420A is to display a web site for ABC Appliance Company on $22^{nd}$ street. The potential workflow 420B is to display information on the XYZ Model 4 television. The potential workflow 420C is to display a list of other stores selling the XYZ Model 4 television. The potential workflow 420D is to send a burglary in progress message to a 911 service. The potential workflow 420N is to display information on the Model 4 two pane door.

The user is also provided other options 430-431. Option 431 is to display additional workflows 420. Option 431 is to cancel the process.

When the image 300 is taken by the camera 103, metadata is associated with the image 300. For example, a date (Friday Apr. 27, 2017), a time 9:30 PM, a location (e.g., GPS coordinates, a direction that the camera 103 is facing, a speed of the camera 103, and/or the like. The image processor 122 analyzes the image 300 to identify the objects 310A-310N. The image processor 122 also identifies characteristic(s) associated with the objects 310A-310N to identify the potential workflows 420A-420N. The identified objects 310A-310N/characteristics are analyzed in conjunction with the metadata to determine potential workflows 420A-420N.

For example, the image processor 122 identifies the store object 310A for the ABC Appliance Company. Based on the location and direction the camera 103 is facing when the image 300 is taken, the image processor 122 determines that the location of the store of the ABC Appliance Company is 306 East $22^{nd}$ street in New York City. Based on this information, the image processor 122 determines the potential workflow 420A of displaying a web page for the ABC Appliance Company on 306 East $22^{nd}$ street in New York City.

In a similar manner, the image processor 122 determines, based on the television object of a XYZ model 4 television (310D), the potential workflow 420B to provide information on the XYZ model 4 television. For example, based on the time 9:30 PM, the image processor 122 can determine that the store is closed (e.g., by doing a web search). Likewise, the potential workflow 420C is determined based on the time and its relationship to potential workflow 420B.

The image processor 122, identifies the person object 310E. The image processor 122 determines a characteristic (the person is crouching) for the person object 310E. Based on the metadata, the image processor 122 uses the metadata to determine that the ABC appliance store is closed (closes at 7:00 PM on Fridays). Based the person crouching (trying to hide) and the fact that the store is closed, the image processor 122 determines the potential workflow 420D.

The image processor 122, determines based on the door object 310B that the door object is a Model 4B two pane door. For example, by doing a web search to find similar looking doors. The image processor 122 determines that the potential workflow 420N is to display information about the Model 4B two pan door.

A similar process may be completed for the sidewalk object 310N. For example, a workflow 420 to repair the sidewalk (based on the crack 330). However, in FIG. 4, any potential workflows 420 for the sidewalk object 310N are not shown because the potential workflows for the sidewalk object 310N have a lower confidence score (i.e., it is less likely that this is what the user is looking for). The user may click on the option to display additional workflows 430 to get a workflow 420 for the sidewalk object 310N.

Figure 5:
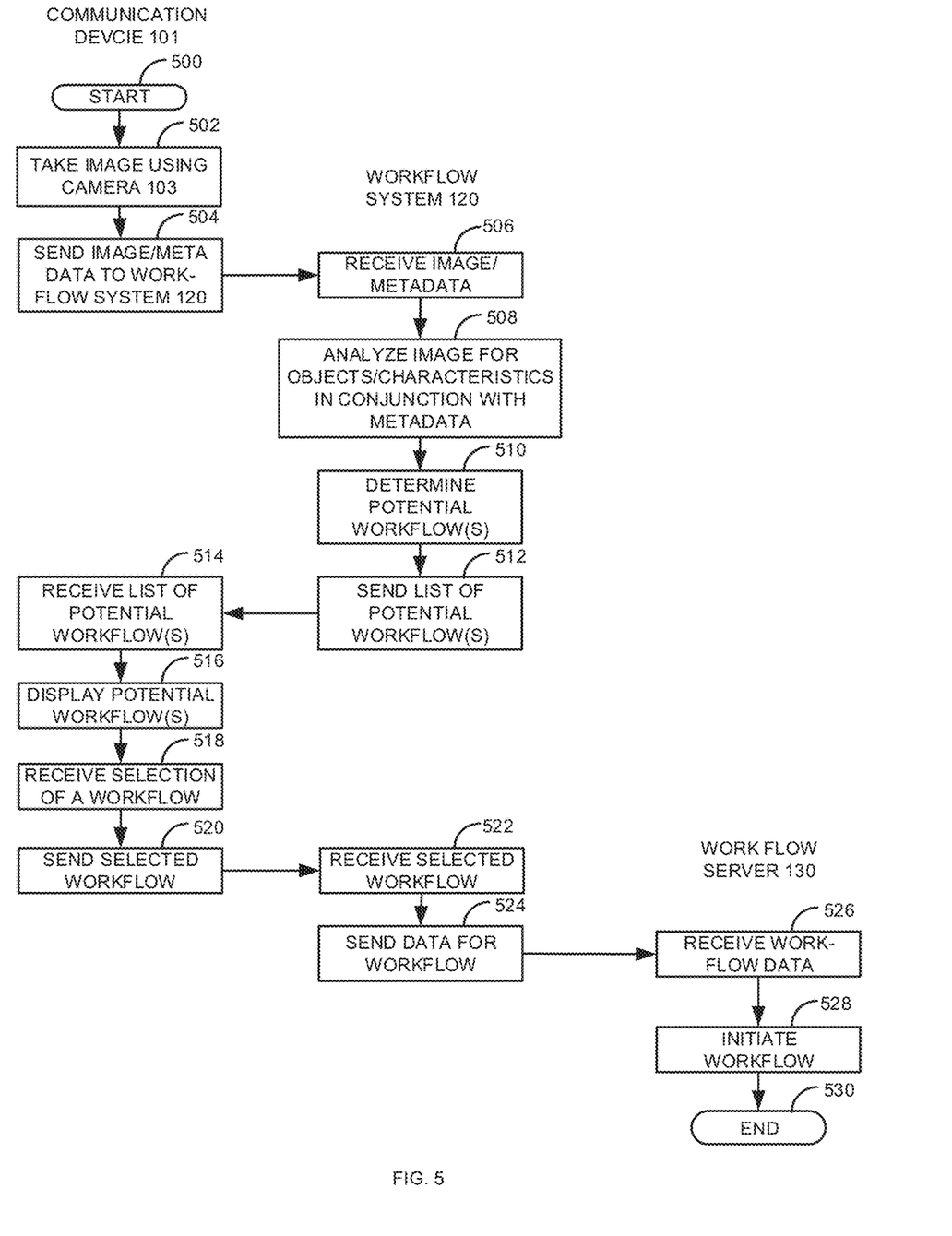
FIG. 5 is a flow diagram of a process for analyzing an image to identify workflows.

FIG. 5 is a flow diagram of a process for analyzing an image 300 to identify workflows 420. Illustratively, the communication device 101, the browser 108, the workflow system 120, the image processor 122, the workflow interface 123, the web server 124, the object builder 223, the workflow API 224, the workflow registration service 226, the workflow builder 227, and the workflow executer 228 are stored-program-controlled entities, such as a computer or microprocessor, which performs the method of FIGS. 5-8 and the processes described herein by executing program instructions stored in a computer readable storage medium, such as a memory or disk. Although the methods described in FIGS. 5-8 are shown in a specific order, one of skill in the art would recognize that the steps in FIGS. 5-8 may be implemented in different orders and/or be implemented in a multi-threaded environment. Moreover, various steps may be omitted or added based on implementation.

The process starts in step 500. A user takes an image 300, in step 502, using the camera 103 on the communication device 101. However, the image 300 does not have to be taken by the camera 103 in the communication device 101. For example, the user may take an image displayed from a web page. When the image 300 is taken, metadata may be associated with the image 300. For example, the metadata may comprise a date/time, an angle, a location, a speed, a distance, a direction, an altitude, a temperature, and/or the like when the image is taken. In addition to the above described types of metadata, other types of metadata associated with the image 300 may include a name of a person taking the image 300, a type of clothing the person is wearing when the image 300 is taken (e.g., heavy cloths to indicate that it may be cold), a telephone number of the communication device 101, and/or the like.

The image 300/metadata is sent, in step 504, to the workflow system 120. The image 300/metadata may be sent in various ways. For example, the user may click on a button displayed on the communication device 101A that sends the picture to a well-known address of the workflow system 120. The image 300 may be sent to the workflow system 120 using Multi-Media Service (MMS), Rich Client Service (RCS), and/or the like.

The workflow system 120 receives, in step 506, the image 300/metadata. The image processor 122 analyzes, in step 508, the image 300 for objects 310/characteristics/actions/ events (e.g., as discussed above) in conjunction with the metadata. The image processor 122 determines, in step 510, potential workflows 420 (e.g., workflows 420A-420N). The image processor 122 sends, in step 512, the list 410 of potential workflows 420, via the workflow interface 123. For example, the list 410 of potential workflows 420 may be sent via web server 124 to the browser 108 or as a text/RCS message to communication device 101. The list 410 of potential workflows 420 may be determined based only on the receipt of the image 300, or based on the image 300 and the metadata.

The communication device 101 receives, in step 514, the list 410 of potential workflows 420. The communication device 101 displays, in step 516, the list 410 of potential workflows 420. The user selects one of the workflows 420. The communication device 101 receives, in step 518, the selection of the workflow 420. In one embodiment, the user may select multiple workflows 420 (e.g., workflow 420A and 420B). The communication device 101 sends, in step 520, the selected workflow 420 to the workflow system 120. The workflow system 120 receives the selected workflow 420 in step 522. The image processor 122 sends, in step 524, data associated with the selected workflow 420 via the workflow interface 123 (using the workflow API 224 for the workflow server 130) to the workflow server 130.

The data to initiate the selected workflow 420 may vary based on the type of workflow 420. For example, if the user selected the workflow 420D, the workflow server 130 may be a 911 service for a police department in New York City. The data may include the image 300, the date/time, the location, a name of the person taking the image 300, a telephone number of the communication device 101, and a message that indicates that there may be a potential burglary at the address 306 East $22^{nd}$ Street.

The workflow server 130 receives, in step 526, the workflow data. The workflow server 130 the initiates, in step 528, the workflow 420 and the process ends in step 530. For example, if the user selected the workflow 420D, initiation of the workflow 420D may be to send a work item to the N.Y. police department. This would allow the N.Y. police department to dispatch an officer to the ABC Appliance store on 306 East $22^{nd}$ Street.

The process of FIG. 5 has the advantage that the user does not have to know the specific type of workflow 420 or how to access the workflow 420. Determining the workflows 420 does not require any user input other than sending the image 300. For example, the user may not know who made the door 310B, that the door 310B is a Model 4B two pane door, who the manufacture is, or how to get information about the door 310B, and/or the like. The workflow system 120 creates this ability with the simple sending of the image 300 to the workflow system 120.

If the user wants to select additional workflows 430 in step 518 (e.g., what the user is looking for is not in the list of workflows 410), instead of sending the selected workflow in step 520, the communication device 101 sends a message to the workflow system 120 (not shown) to get the next list of potential workflows 410. The workflow system 120 determines in step 510 the next list of workflows 410 (those that were initially below a confidence score (see steps 720 and 722 of FIG. 7). The workflow system 120 sends in step 512 the next list of workflows 410 and the process continues as shown in FIG. 6.

Figure 6:
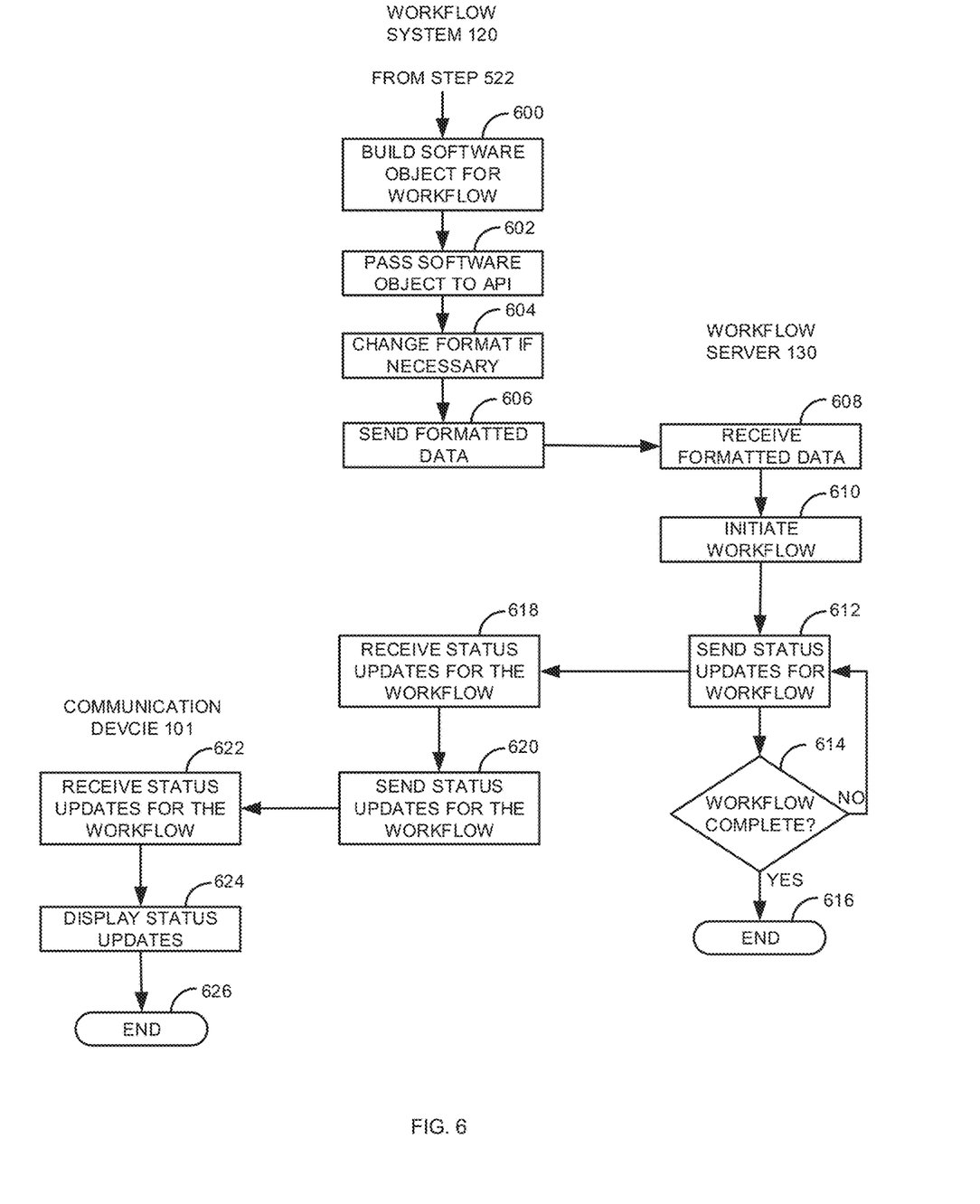
FIG. 6 is a flow diagram of a process for creation of software objects that are used to initiate workflows on a workflow server.

FIG. 6 is a flow diagram of a process for creation of software objects that are used to initiate workflows 420 on a workflow server 130. The process of FIG. 6 is an exemplary embodiment of steps 524, 526, and 528. After receiving the selected workflow 420, in step 522, the object builder 223 builds, in step 600, a software object that can be used by the workflow API 224/workflow interface 123. For example, the workflow API 224 may use Java software objects created by the object builder 223 as shown below.

public static int send_workflow(string sparam1, string sparam 2, int workflow_type)

The object builder 223 provides, in sparam 1 the string "ABC Appliance Company," in sparam 2 the string "306 East $22^{nd}$ Street, New York City," and a 1 for the workflow_type (the 1 indicates a web search workflow 420). The object builder 223 passes, in step 602, the software object to the workflow API 224. The workflow API 224 changes, in step 604, the format of the software object if necessary. For example, if the workflow server 130 uses XML, the formatted XML tags may look as follows.

search parameter 1="ABC Appliance Company"

search parameter 2="306 East $22^{nd}$ Street, New York City"

The workflow interface 123 sends, in step 606, the formatted data to the workflow server 130. The workflow_type parameter is used to identify the specific workflow server 130 that can handle execute the workflow 420. For example, if the workflow_type parameter is a 1, the workflow server 130A may be selected. If the workflow_type parameter is a 2, the workflow server 130N may be selected. The workflow server 130 receives the formatted data in step 608. The workflow server 130 then initiates the workflow 420 in step 610.

The workflow server 130 sends, in step 612, status updates for the workflow 420 (if necessary). A status update may indicate the progress of the workflow. For example, if the workflow is to fix a leak shower head in a hotel, the status update message may be that a plumber has been notified, that the shower head has been fixed, and/or the like. The workflow server 130 determines, in step 614, if the workflow 420 has been completed. If the workflow 420 is completed in step 614, the process on the workflow server 130 ends in step 616. Otherwise, if the workflow 420 is not complete in step 614, the process goes back to step 612 where additional status update messages may be sent if necessary.

If a status update has been sent in step 612, the workflow system 120 receives the status update in step 618. Alternatively, the status updates may be sent directly the to the communication device 101. The workflow system 120 (workflow executor 228) sends the status update for the workflow 420 in step 620. The communication device 101 receives the status updates in step 622. The communication device 101 displays the status updates in step 624 and the process ends in step 626.

Figure 7:
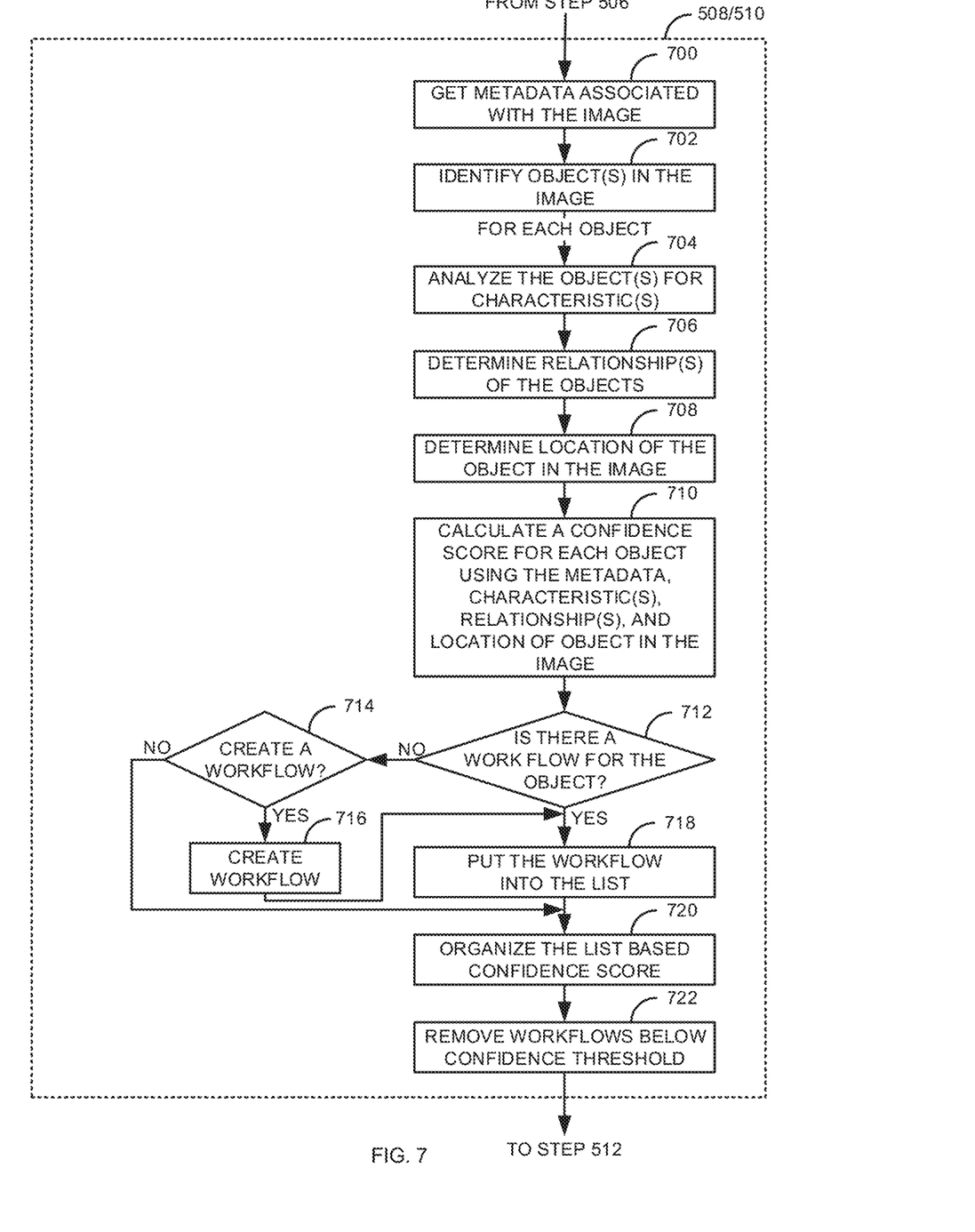
FIG. 7 is a flow diagram of a process for analyzing images to identify workflows.

FIG. 7 is a flow diagram of a process for analyzing images 300 to identify workflows 420. The process of FIG. 7 is an exemplary embodiment of step 508/510 in FIG. 5. After receiving the image 300/metadata in step 506, the image processor 122 gets, in step 700, the metadata associated with the image 300 (if there is any). The image processor 122 identifies, in step 702, one or more objects 310 in the image 300. For each identified object 310 the process implements steps 704-718. In one embodiment, objects may be screened based on one or more rules to eliminate objects that are less likely to be a match for what the user is looking for.

For each object, the image processor 122 analyzes, in step 704, the object for any 310 characteristics (i.e., actions, or events). For example, for the workflow 420D the image processor 122 may determine that the person 310E is trying to hide (action) or that the sidewalk object 310N has a crack 330 (characteristic). The image processor 122 may determine that an object 310 may have multiple characteristics (actions). For example, a person may be running and then tripping in a video.

The image processor 122 determines, in step 706 if there is a relationship between the objects 310. For example, in FIG. 3, the image processor 122 may determine that there is a relationship between the store object 310A, the sign object 310C, and the television object 310D. The image processor 122 may determine that the sidewalk object 310N does not have a significant relationship with the objects 310A-310E.

For each object, the image processor 122 determines, in step 708, the location of the object 310 in the image 300. Typically, when an image 300 is taken, the user centers the most important object 310 in the center of the image 300. In one embodiment, a higher confidence score (see step 710) is given to objects 310 that are centered in the image 300. Thus, if an object 310 is not centered in the image 300, but is near the edge of the image 300, the object 310 that is near the edge of the image 300 may be give a lower confidence score.

For each object 310, image processor 122 calculates a confidence score in step 710. The confidence score is calculated using the object and some or all of the metadata, the characteristic(s), (i.e., object characteristics, actions(s), event(s)), the relationship(s), and/or the location of the object 310 in the image 300. In one embodiment, the confidence score does not use one or more of the metadata, the characteristic(s), the relationship(s) and/or the location of the object 310. The confidence score may be based on one or more rules. For example, different types of the metadata, characteristics, locations in the image 300, and relationships may be given different weights based on rules for each type of workflow 420.

The image processor 122 determines, in step 712, if there is a workflow 420 for the object 310. For example, if the object is a shower head that is leaking in a location (e.g., at a Holiday Inn® on 123 4$^{th}$ street in Salt Lake City Utah), the image processor 122, determines, in step 712, if there is a workflow 420 on a workflow server 130 that can deal with leaky shower heads in the Holiday Inn® on 123 4$^{th}$ street in Salt Lake City Utah (e.g., if the Holiday Inn® has registered a service (as described in FIG. 8) to handle plumbing services). If there is a match in step 712, the workflow 420 is put in the list 410 of workflows in step 718 and the process goes to step 720.

Otherwise, if there is not a match in step 712, the image processor 122 determines if a workflow 420 may be created in step 714. For example, the image processor 122 may be able to build unique web search workflow 420 to get the necessary information on a particular object 310. If a workflow 420 cannot be created in step 714, the process goes to step 720. Otherwise, if a workflow 420 can be created in step 714, the image processor 122 dynamically creates the workflow 420 in step 716. The workflow 420 of step 716 may be created based only on the image 300 (objects and/or characteristics), or based on the image and the metadata. The workflow 420 is then put in the workflow list 410 in step 718 and then goes to step 720.

The workflow list 410 is then organized based on the confidence score for each object 310 in step 720. Workflows 420 are then removed that fall below a defined confidence score threshold in step 722. For example, if the threshold is 0.5 (in a range of 0 to 1.0) any workflows 420 that have a confidence score below the confidence threshold of 0.5 would be dropped from the initial list. However, a user may elect to see the additional workflows 420 (e.g., by selecting option 430 to view additional workflows 420). The process then goes to step 512. Alternatively, a defined number of workflows 420 may be selected (e.g., the top five workflows).

Figure 8:
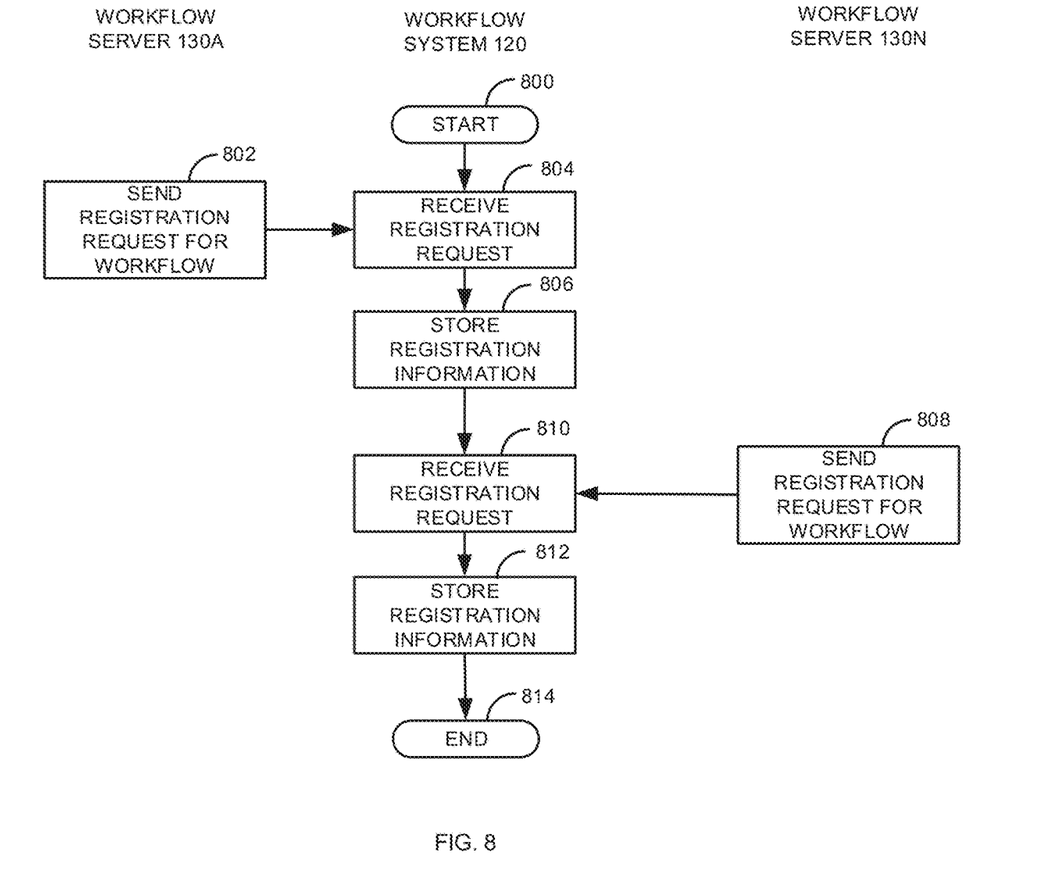
FIG. 8 is a flow diagram of a process for registration of workflows on different workflow servers on a computer network.

FIG. 8 is a flow diagram of a process for registration of workflows 420 on different workflow servers 130 on a computer network 110. The process starts in step 800. The workflow server 130A sends, in step 802, a registration request to the workflow registration service 226 to register a workflow service. The registration request may comprise information that allows the image processor 122 to send a workflow 420 to the workflow server 130A. The registration request of step 802 may also comprise information (e.g., how to format the data) that allows the image processor 122 to send the data for the workflow 420 of steps 524/606. For example, the registration information may comprise a URL of the workflow server 130A and a format for other information. The registration service 226 receives the registration request in step 804. The registration service 226 stores the registration information in step 806.

The workflow server 130N sends a registration request for a workflow 420 in step 808 to the registration service 226. The registration service 226 receives, in step 810, the registration request of step 808. The registration service 226 stores the registration information in step 812. The process ends in step 814.

The process of FIG. 8 only describes registration of two workflows 420. However, any number of workflows 420 may be registered. For example, the registration messages of steps 802/808 may register multiple workflows 420 in the same message. Alternatively, additional workflow servers 130 may register workflows 420.

The types of workflows 420 that may be registered may comprise any number of different types of workflows 420. For example, the registered workflows 420 of FIG. 8 may comprise a plumbing service, an inventory ordering service for a factory, an emergency service (e.g., police, fire, etc.), a tow truck service, a repair manual service, a restaurant location service, a road repair service, a traffic light repair service, a web search service, and/or the like.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a microprocessor; and
   a computer readable medium, coupled with the microprocessor and comprising microprocessor readable and executable instructions that cause the microprocessor to:
   receive an image, wherein the image has associated metadata;
   identify one or more objects in the image;
   analyze the one or more objects for one or more characteristics in conjunction with the metadata;
   in response to analyzing the one or more objects for the one or more characteristics in conjunction with the metadata, determine one or more potential workflows;
   send a list that identifies the one or more potential workflows;
   receive input to select one of the one or more potential workflows; and
   send information to initiate the selected one of the one or more potential workflows.

2. The system of claim 1, wherein analyzing the one or more objects for the one or more characteristics in conjunction with the metadata comprises: identifying a plurality of individual objects in the image, wherein determining the one or more potential workflows comprises: determining a plurality of separate workflows based on the plurality of individual objects in the image.

3. The system of claim 1, wherein determining the one or more potential workflows comprises dynamically creating at least one of the one or more workflows based only on the received image, or based only on the received image and the metadata.

4. The system of claim 1, wherein the one or more objects comprises a plurality of objects and wherein analyzing the one or more objects for the one or more characteristics in conjunction with the metadata comprises determining a relationship between at least two of the plurality of objects in the image.

5. The system of claim 1, wherein the executable instructions further cause the microprocessor create a software object in a first computer format, send the software object to an Application Programming Interface (API) that formats the software object into a second computer format, and wherein the software object identifies a specific workflow service on a specific workflow server.

6. The system of claim 1, wherein the input to select the one of the one or more workflows is a selection of a plurality of workflows and wherein the sent information initiates the plurality of separate workflows on a plurality of different workflow servers on a computer network.

7. The system of claim 1, wherein the metadata comprises a location of the image and a name of a person taking the image and wherein the determined one or more potential workflows is based on the location of the image and the name of a person taking the image.

8. The system of claim 1, wherein the metadata is sent as information to initiate the selected workflow.

9. The system of claim 1, wherein analyzing the one or more objects for the one or more characteristics in conjunction with the metadata comprises analyzing the image based on an angle of the image or a distance from the image.

10. The system of claim 1, wherein the metadata comprises a speed of the communication device taking the image and wherein the determined one or more potential workflows is based on the speed of the communication device taking the image.

11. The system of claim 1, wherein the one or more characteristics comprises at least one of an event or an action.

12. A method comprising:
    receiving, by a microprocessor, an image, wherein the image has associated metadata;
    identifying, by the microprocessor, one or more objects in the image;
    analyzing, by the microprocessor, the one or more objects for one or more characteristics in conjunction with the metadata;
    in response to analyzing the one or more objects for the one or more characteristics in conjunction with the metadata, determining, by the microprocessor, one or more potential workflows;
    sending, by the microprocessor, a list that identifies the one or more potential workflows;
    receiving, by the microprocessor, input to select one of the one or more potential workflows; and
    sending, by the microprocessor, information to initiate the selected one of the one or more potential workflows.

13. The method of claim 11, wherein analyzing the one or more objects for the one or more characteristics in conjunction with the metadata comprises: identifying a plurality of individual objects in the image, wherein determining the one or more potential workflows comprises: determining a plurality of separate workflows based on the plurality of individual objects in the image.

14. The method of claim 11, wherein determining the one or more potential workflows comprises dynamically creating at least one of the one or more workflows based only on the received image, or based only on the received image and the metadata.

15. The method of claim 11, wherein the one or more objects comprises a plurality of objects and wherein analyzing the one or more objects for the one or more characteristics in conjunction with the metadata comprises determining a relationship between at least two of the plurality of objects in the image.

16. The method of claim 11, further comprising:
    creating a software object in a first computer format;
    sending the software object to an Application Programming Interface (API) that formats the software object into a second computer format; and wherein the software object identifies a specific workflow service on a specific workflow server.

17. The method of claim 11, wherein the input to select the one of the one or more workflows is a selection of a plurality of workflows and wherein the sent information initiates the plurality of separate workflows on a plurality of different workflow servers on a computer network.

18. The method of claim 11, wherein the metadata comprises a location of the image and a name of a person taking the image and wherein the determined one or more potential workflows is based on the location of the image and the name of a person taking the image.

19. The method of claim 11, wherein the metadata comprises a speed of the communication device taking the image and wherein the determined one or more potential workflows is based on the speed of the communication device taking the image.

20. A communication device comprising:
a camera that takes an image;
a microprocessor; and
a computer readable medium, coupled with the microprocessor and comprising microprocessor readable and executable instructions that cause the microprocessor to:
capture metadata when the camera takes the image, wherein the metadata is associated with the image;
send the image and the metadata;
receive a list of potential workflows that have been determined based on one or more objects in the image, one or more characteristics of the one or more objects in the image, and/or the metadata; and
send a selected one of the potential workflows in the list potential workflows, wherein the sent selected one of the potential workflows initiates a selected workflow on a workflow server.

* * * * *

UNITED STATES PATENT AND TRADEMARK OFFICE
CERTIFICATE OF CORRECTION

PATENT NO. : 10,671,847 B2  
APPLICATION NO. : 15/602408  
DATED : June 2, 2020  
INVENTOR(S) : David Chavez and Laurent Philonenko Page 1 of 1

It is certified that error appears in the above-identified patent and that said Letters Patent is hereby corrected as shown below:

In the Claims

Column 16, Line 45, Claim 13 delete "11" and insert --12-- therein.

Column 16, Line 52, Claim 14 delete "11" and insert --12-- therein.

Column 16, Line 57, Claim 15 delete "11" and insert --12-- therein.

Column 16, Line 63, Claim 16 delete "11" and insert --12-- therein.

Column 17, Line 3, Claim 17 delete "11" and insert --12-- therein.

Column 17, Line 8, Claim 18 delete "11" and insert --12-- therein.

Column 17, Line 13, Claim 19 delete "11" and insert --12-- therein.

Signed and Sealed this  
Eighth Day of September, 2020

Andrei Iancu  
*Director of the United States Patent and Trademark Office*